(12) United States Patent
Farrar

(10) Patent No.: US 7,060,201 B2
(45) Date of Patent: Jun. 13, 2006

(54) OPTICAL BRIGHTENERS THEIR COMPOSITION THEIR PRODUCTION AND THEIR USE

(75) Inventor: John Martin Farrar, Leeds (GB)

(73) Assignee: Clariant Finance (BVI) Limited, Tortola (VG)

( * ) Notice: Subject to any disclaimer, the term of this patent is extended or adjusted under 35 U.S.C. 154(b) by 7 days.

(21) Appl. No.: 10/492,871

(22) PCT Filed: Oct. 18, 2002

(86) PCT No.: PCT/IB02/04316

§ 371 (c)(1),
(2), (4) Date: Apr. 16, 2004

(87) PCT Pub. No.: WO03/033568

PCT Pub. Date: Apr. 24, 2003

(65) Prior Publication Data

US 2004/0237846 A1     Dec. 2, 2004

(30) Foreign Application Priority Data

Oct. 19, 2001 (GB) .................................. 0125177.6

(51) Int. Cl.
D21H 21/30       (2006.01)
C08G 73/02       (2006.01)

(52) U.S. Cl. .............................. 252/301.23; 428/32.1; 524/815; 524/800; 528/403; 528/421; 528/482; 162/135; 162/158; 162/162; 162/164.3; 162/164.6

(58) Field of Classification Search ..................... None
See application file for complete search history.

(56) References Cited

U.S. PATENT DOCUMENTS

| | | | |
|---|---|---|---|
| 5,873,913 A | 2/1999 | Cowman et al. | |
| 6,210,449 B1 | 4/2001 | Rohringer et al. | |
| 6,426,382 B1 * | 7/2002 | Farrar et al. | 524/815 |
| 6,911,116 B1 * | 6/2005 | Farrar et al. | 162/135 |

FOREIGN PATENT DOCUMENTS

| | | |
|---|---|---|
| EP | 1 086 825 A1 | 3/2001 |
| WO | WO 96/00221 A1 | 1/1996 |
| WO | WO 98/42885 A1 | 10/1998 |
| WO | WO 99/67317 * | 12/1999 |
| WO | WO 01/46323 * | 6/2001 |

OTHER PUBLICATIONS

English abstract for JP 62-108966.

* cited by examiner

*Primary Examiner*—C. Melissa Koslow
(74) *Attorney, Agent, or Firm*—Tod A. Waldrop

(57) ABSTRACT

Optical brighteners ($P_{AB}$) of formula

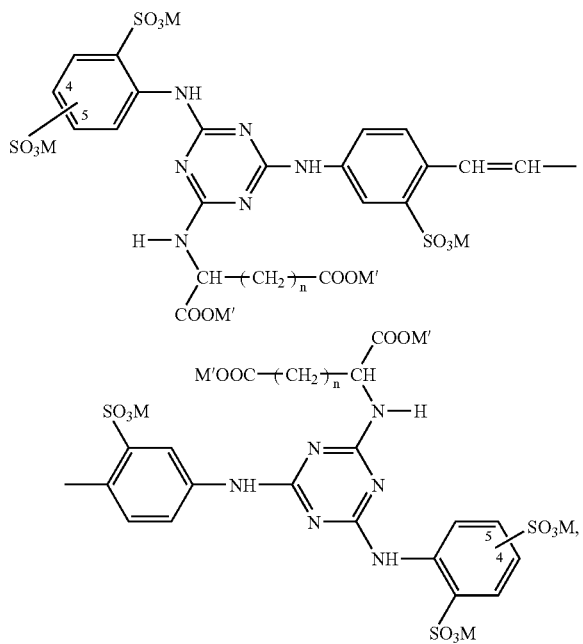

(I)

wherein
each n independently signifies 1 or 2,
the group $SO_3M$ shown with the floating bond is linked to the position 4 or 5,
each M independently signifies an equivalent of a non-chromophoric cation, each M' independently signifies hydrogen or M,
at least a part of the cations M of ($P_{AB}$) are cationic groups of a polycationic polyol/epichlorohydrin/amine polymer ($P_A$), which contains quaternary ammonium groups in salt form as heteroatomic ring members or chain members, any others being cations selected from alkali metal cations, unsubstituted ammonium and ammonium substituted with $C_{1-3}$-alkyl or/and $C_{2-3}$-hydroxyalkyl,
the polycationic polymer ($P_A$) is a polymer which is at least in part crosslinked over one or more of its quaternary ammonium groups,
any other counterions to the cationic groups of ($P_A$) being non-chromophoric anions of low molecular acids,
and the ratio of the total anionic groups in the anionic optical brightener portion of ($P_{AB}$) to the total of cationic ammonium groups in the polycationic polymer ($P_A$) portion of ($P_{AB}$) is $\geq 80/100$,
and their aqueous compositions (W), their production and their use, also in combination with white pigments or fillers, in particular for the production of optically brightened paper.

14 Claims, No Drawings

OPTICAL BRIGHTENERS THEIR COMPOSITION THEIR PRODUCTION AND THEIR USE

In the production of paper it is usual to employ retention agents, dewatering agents and/or fixatives in order to improve the speed of production or other properties and yield of the product. These adjuvants are mostly of cationic character, and if it is desired to produce an optically brightened paper, care should be taken that with the use of an anionic optical brightener there does not occur a precipitation by interaction of the anionic and cationic substances. In order to avoid such an undesirable precipitation, the cationic agents are usually added at a sufficient time after the addition of the anionic component, either within a very short time range immediately before sheet formation (i.e. a few seconds before conveying the pulp to the paper sheet forming part of the assembly) or after sheet formation.

In Japanese Kokai JP 62-106965 A2 there are described optical brighteners of the 4,4'-bis-triazinylamino-stilbene-2,2'-disulphonic acid series produced by reaction of 2 molar proportions of cyanuric chloride with 2 molar proportions of aniline-2,5-disulphonic acid, then with one molar proportion of 4,4'-diaminostilbene-2,2'-disulphonic acid and finally with 2 molar proportions of certain defined aminoacids (including among others also aspartic acid and glutamic acid) which may be the natural L-form or the synthetic D,L-form; they are described in salt form, in particular in sodium salt form, as optical brighteners of high water solubility. With regard to their use for the optical brightening of paper, it is stated that they are not efficient for use as internal additives, i.e. for adding in the pulp slurry before making the paper.

In WO-A-99/67317 there are described aqueous solutions of polycationic polymers containing quaternary ammonium groups in salt form as heteroatomic chain members or ring members of the polymer, wherein a part of the counter-ions to the quaternary cationic groups are anionic groups of anionic optical brighteners, containing at least one anionic group, in which the cationic quaternary ammonium groups are in substantial excess over the anionic groups of the anionic optical brighteners, in particular in the range of 100/60 to 100/2. The aqueous solutions of these combined products are of high stability and provide multi-functional agents that combine the activity of the optical brighteners and of the cationic polymers (e.g. as retention assistant, drainage assistant or fixative in paper production), which in the production of optically brightened paper allows the addition of optical brightener together with the cationic polymer, e.g. by adding it to the stock at any time before sheet formation. (Product combinations of this kind are also described in WO-A-01/46323 for white mineral pigments.) The limited ratio of polymer to optical brightener does, however, limit accordingly the possibility of using high proportions of optical brightener or low proportions of cationic polymer so that these products, although highly effective in a certain range, may not suffice to fulfil the requirements of the full range of base paper or board qualities as may occur in paper industry. If the proportion of the exemplified optical brighteners to the exemplified polymers is increased to a ratio of anionic groups of the total anionic optical brighteners to cationic quaternary ammonium groups of the total cationic polymer to a ratio substantially above 60/100, especially above 80/100, so as to give a prevailing anionic character—as resulting from the total equilibrium of the strongly anionic sulpho groups and optionally any weakly anionic carboxy groups on the one side and the cationic quaternary ammonium groups on the other side—to the combined product, the viscosity and stickiness of the obtained composition diluted with water, as would be required for use e.g. in papermaking, increases accordingly with increasing anionicity to give a viscous and sticky mass ("chewing gum-like") up to a hard mass, which is unusable for practical purposes, in particular in papermaking.

It has now surprisingly been found that with the below—overall anionic—combination ($P_{AB}$) of the defined particular optical brighteners and the defined particular polymers it is possible to produce fluid and readily dilutable concentrated aqueous compositions of high stability, in which the ratio of anionic groups in the optical brighteners to the cationic quaternary ammonium groups in the polymer is 80/100 or more, so that any desired high proportion of optical brightener to polymer becomes available as may suit any requirement for the production of the most various optically brightened paper and board qualities.

The invention relates to the defined combined products ($P_{AB}$), their aqueous compositions, their production and their use.

The invention thus provides an optical brightener ($P_{AB}$) of formula

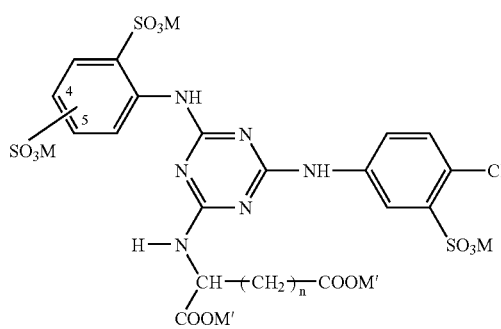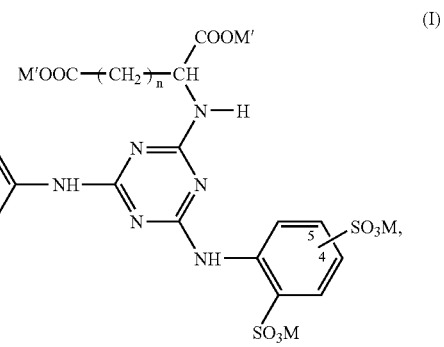

(I)

wherein
each n independently signifies 1 or 2,
the group $SO_3M$ shown with the floating bond is linked to the position 4 or 5,
each M independently signifies an equivalent of a non-chromophoric cation,
each M' independently signifies hydrogen or M, at least a part of the cations M of (P$_{AB}$) are cationic groups of a polycationic polyol/epichlorohydrin/amine polymer (P$_A$), which contains quaternary ammonium groups in salt form as heteroatomic ring members or chain members, any others being cations selected from alkali metal cations, unsubstituted ammonium and ammonium substituted with C$_{1-3}$-alkyl or/and with C$_{2-3}$-hydroxyalkyl, the polycationic polymer (P$_A$) is a polymer which is at least in part crosslinked over one or more of its quaternary ammonium groups, any other counterions to the cationic groups of (P$_A$) being non-chromophoric anions of low molecular acids, and the ratio of the total anionic groups in the anionic optical brightener portion of (P$_{AB}$) to the total of cationic ammonium groups in the polycationic polymer (P$_A$) portion of (P$_{AB}$) is $\geq 80/100$.

The invention further provides a liquid aqueous optical brightener composition (W) comprising an optical brightener (P$_{AB}$).

The process for the production of the optical brighteners (P$_{AB}$) as defined above and their compositions (W) is in particular characterised in that (B) an anionic optical brightener of the formula

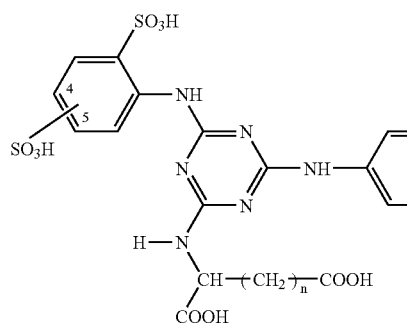

wherein
each n independently signifies 1 or 2,
and the group SO$_3$H shown with the floating bond is linked to the position 4 or 5, in free acid or alkali metal or/and ammonium salt form, wherein ammonium is unsubstituted or substituted with C$_{1-3}$-alkyl or/and with C$_{2-3}$-hydroxyalkyl,
optionally in the form of an aqueous dispersion or solution, is added to an aqueous solution of (P$_A$) a polycationic polyol/epichlorohydrin/amine polymer containing quaternary ammonium groups in salt form as heteroatomic chain members or ring members of the polymer, which is at least in part crosslinked over one or more of these quaternary ammonium groups and in which the counter-ions to the cationic quaternary ammonium groups are anions of mineral acids, anions of low molecular carboxylic acids or anions deriving from a quaternizing agent, or an aqueous solution of (B) in the form of the free acid or alkali metal salt, is added to an aqueous solution of a precursor (P$_{PA}$) Of (P$_A$), and if it has been added to a precursor (P$_{PA}$) Of (P$_A$), it is further reacted to form (P$_A$) or respectively (P$_{AB}$), in such an equivalents ratio that the total anionic groups in the anionic optical brightener (B) to the total of cationic ammonium groups in the polycationic polymer (P$_A$) is $\geq 80/100$, and the obtained product (P$_{AB}$) is in the form of a liquid aqueous composition (W).

In formula (I) and in formula (II) the group SO$_3$M or SO$_3$H shown with the floating bond is preferably linked to the position 5.

Where M is not a counterion—in particular a quaternary ammonium cation—of (P$_A$) it is an alkali metal cation (preferably lithium, sodium or potassium, more preferably sodium) or ammonium which is either unsubstituted or substituted with C$_{1-3}$-alkyl or/and C$_{2-3}$-hydroxyalkyl (preferably mono-, di- or tri-ethanol- or -isopropanol-ammonium); among these cations the alkali metal cations are preferred, especially sodium.

The radicals of the formula

 (a)

are radicals of aspartic or glutamic acid, optionally in M-salt form, and may be the radical of D-, L- or DL-aspartic or -glutamic acid, optionally in M-salt form.

The optical brighteners (B) may be employed in any form as commercially available, e.g. as powders or granules, which may be dissolved in water before combination with (P$_A$) or, with particular advantage, they may be employed in the form of an aqueous solution directly from production. Usually they are produced in a three-stage reaction sequence by reacting cyanuric chloride first with aminobenzene-2,4- or -2,5-disulphonic acid, then with 4,4'-diaminostilbene-2,2'-disulphonic acid and finally with aspartic or glutamic acid, optionally in salt form, in aqueous medium under dehydrochlorinating conditions (e.g. the first chlorine at pH 4–7 and at 5–15° C., the second chlorine at pH 6–9 and at 10–40° C., and the third chlorine at pH 8–11 and at 60–100° C., with addition of alkali metal hydroxide).

The quaternary ammonium groups in (P$_A$) are covalently linked to at least two carbon atoms of the polymer. The polymers (P$_A$) are advantageously of aliphatic character. They may contain further heteroatoms, in particular oxygen atoms and/or non-quaternary amino groups. The heteroatoms in the polymer are preferably at a distance of 2 to 6 carbon atoms from each other.

The polymers (P$_A$) are epichlorohydrin derived polyquaternary polymers, in particular reaction products of epichlo-

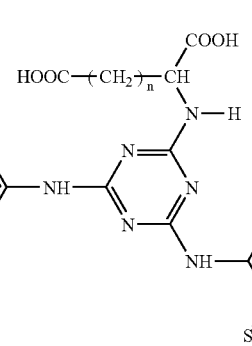

rohydrin with polyols and amines, preferably secondary and/or tertiary amines, under conditions leading to at least partial crosslinking.

More particularly, the epichlorohydrin-derived polymers ($P_A$) are polyquaternary, at least partially crosslinked polymers obtainable by a two- or three-stage synthesis, in which in the first stage epichlorohydrin is reacted with a polyol to give a chloroterminated adduct ($P_{PA}$), and in the second stage the chloroterminated adduct ($P_{PA}$) is reacted with an at least bifunctional secondary or tertiary amine in order to obtain a crosslinked product with quaternary ammonium groups in the polymer structure; if any terminal chlorine is still present in the reaction product, this may be reacted in a third stage e.g. with a monofunctional tertiary amine.

As starting polyols there may be employed preferably aliphatic hydroxy compounds, in particular poly-functional alcohols, preferably oligohydroxy compounds with preferably two to six carbon atoms and polyalkylene glycols of average molecular weight $\overline{M}_W$ preferably $\leq 2000$ and wherein alkylene contains 2–4 carbon atoms.

Suitable hydroxy compounds are in particular oligofunctional aliphatic alcohols and/or poly-($C_{2-4}$-alkylene)glycols, especially bi- to hexa-functional aliphatic alcohols with up to six, preferably three to six, carbon atoms in the hydrocarbon radical, in particular of the following formula $$X\text{---}(OH)_{x1} \qquad (IIIa),$$

in which

X signifies the x1-valent radical of a $C_{3-6}$-alkane and x1 signifies a number from 3 to the number of carbon atoms in X, or a mixture of oligohydroxyalkanes of formula (IIIa), or a mixture one or more oligohydroxyalkanes of formula (IIIa), with a $C_{2-3}$-alkanediol, or polyalkyleneglycols, in particular of the average formula $$HO\text{-}(Alkylene\text{-}O)_{x2}\text{---}H \qquad (IIIb),$$

wherein

Alkylene signifies $C_{2-4}$-alkylene and x2 signifies a number from 2 to 40.

Preferred compounds of formula (IIIa) are those of formula $$H\text{---}(CHOH)_{x1'}\text{---}H \qquad (IIIa')$$

with x1' being 3 to 6.

Alkylene in formula (IIIb) is ethylene, propylene and/or butylene and the polyalkyleneglycols of formula (IIIb) may be homo- or copolymers, preferably water soluble products (with a solubility in water of at least 10 g/l at 20° C. and pH 7). As polyalkyleneglycols of formula (IIIb) there are preferably employed polyethyleneglycols or copolyalkyleneglycols containing a prevailing molar proportion of ethyleneoxy-units. More preferably there are employed polyethyleneglycols, i.e. compounds of formula (IIIb) in which Alkylene signifies only ethylene.

By the reaction of the hydroxy groups with the epichlorohydrin the epoxy ring of the epichlorohydrin is opened and a corresponding adduct is formed which contains a 2-hydroxy-3-chloro-propyl-1 radical. This reaction is preferably carried out in the absence of any other solvent and, especially for hydroxy, in the presence of a catalyst, which is e.g. a Lewis acid, preferably boron trifluoride e.g. in the form of its etherate or acetic acid complex. This reaction is exothermic and the epichlorohydrin reacts with the available hydroxy groups and, as reaction proceeds, may also react with a hydroxy group of a 2-hydroxy-3-chloropropyl-1 radical formed during the reaction, so that some of the hydroxy groups in a polyfunctional starting reactant [e.g. of formula (IIIa)] may even remain non-reacted. Depending on the molar ratio, on the functionality of the starting hydroxy-compound and on its configuration—especially if x1 in formula (IIIa) is 4 to 6—the degree of reaction of the x1 OH groups with epichlorohydrin may vary, and may e.g. be in the range of 50 to 95%, mostly 70 to 90%, of the total number of OH groups originally present in the starting polyol. The obtained adduct ($P_{PA}$) is a chloro-terminated product.

The chloroterminated adduct ($P_{PA}$) is then reacted with a suitable amine to produce a polyquaternary crosslinked product, preferably with a crosslinking reactant that is capable of providing a bridging quaternary ammonium group, which suitably is a preferably aliphatic tertiary oligoamine or secondary monoamine. Such amines may for instance be reaction products of epichlorohydrin with a primary or secondary amine, for instance with mono- or di-($C_{1-4}$-alkyl)-amines, mono- or di-($C_{2-4}$-hydroxyalkyl)-amines or oligoamines with 2 to 4 carbon atoms in the alkylene bridge, such as mono- or dimethylamine, mono- or diethylamine, mono- or diisopropylamine, mono- or diethanolamine, mono- or diisopropanolamine, ethylenediamine, propylenediamine, butylenediamine, diethylenetriamine, triethylenetetramine, tetraethylenepentamine or N-(2-aminoethyl)-ethanolamine, or preferably they correspond to the following formula

in which

Y signifies $C_{2-3}$-alkylene, y signifies a number from 0 to 3,

R' signifies $C_{1-3}$-alkyl or $C_{2-3}$-hydroxyalkyl and R" has a significance of R', if y is 1 to 3, or signifies hydrogen, if y is 0, especially as a reactant leading to a crosslinking, where the starting oligohydroxy compound is of formula (IIIa).

or to the following formula

wherein

R'" signifies hydrogen or $C_{1-3}$-alkyl and w signifies a number from 2 to 6, the amines of formula (V) being especially suitable as reactants, where the starting oligo-hydroxy compound is of formula (IIIb).

For an optional chain-terminating, quaternizing reaction there may e.g. be employed a tertiary monoamine preferably of formula.

N(R')₃                                                                 (VI).

As amino compounds of formulae (IV), (V) and (VI) there may be employed known amines. The $C_{1-3}$-alkyl radicals in R', R" and R'" may be methyl, ethyl, propyl or isopropyl, the lower molecular ones being preferred, especially methyl. The $C_{2-3}$-hydroxyalkyl radicals are preferably 2-hydroxyethyl or -propyl. Among the $C_{1-3}$-alkyl radicals and the $C_{2-3}$-hydroxyalkyl radicals the $C_{1-3}$-alkyl radicals are preferred, especially methyl. The index y may be any number from 0 to 3 preferably 0 to 2, more preferably 0 or 1. Representative amines of formula (IV) are dimethylamine, diethanolamine, tetramethylethylenediamine, tetramethylpropylenediamine, N,N-diethanol-N',N'-dimethylethylenediamine, pentamethyldiethylenetriamine and hexamethyltriethylenetetramine, among which the difunctional amines, in particular the lower molecular ones, are preferred, especially dimethylamine and tetramethylethylenediamine. In formula (V) the index w preferably is 2 or 3. Representative amines of formula (V) are N,N-dimethylaminopropylamine, N,N-diethanolaminopropylamine, tetramethylethylenediamine, tetramethylpropylenediamine and N,N-diethanol-N',N'-dimethylethylenediamine. Representative amines of formula (VI) are trimethylamine, triethylamine and triethanolamine, among which trimethylamine and triethylamine are preferred.

The polycationic polyquaternary products ($P_A$) or the optical brighteners ($P_{AB}$) are polymers at least insofar as either the reaction of ($P_{PA}$) with the amine leads to a polymer or the starting product is polymeric (e.g. is a polyalkylene glycol) or both.

The molar ratio of quaternizing amine to epichlorohydrin adduct ($P_{PA}$) is suitably chosen so that a product of polymeric character is produced. The molar ratio of quaternizing amine to epichlorohydrin adduct to a compound of formula (IIIa) is preferably chosen so that for every mole-equivalent of adduct referred to chlorine there is employed 0.5 mole of crosslinking amine, preferably of formula (IV), ±30%, e.g. ±10%. The molar ratio of quaternizing amine to epichlorohydrin adduct of a compound of formula (IIIb) is preferably chosen so that for every mole-equivalent of adduct referred to chlorine there is employed 1 mole of amine of formula (IV) ±40%, e.g. ±20%. The molar ratio of quaternizing amine to epichlorohydrin adduct of a compound of formula (IIIb) is preferably chosen so that for every mole-equivalent of adduct referred to chlorine there is employed 0.9 mole of amine of formula (V)±40%, e.g. ±20% (if both R'" are hydrogen) or 0.5 mole of amine of formula (V)±30%, e.g. ±10% (if both R'" are other than hydrogen) or 0.7 mole of amine of formula (V) ±35% e.g. ±15% (if one R'" is hydrogen and the other is other than hydrogen).

The reaction of quaternizing amine with the adduct is carried out preferably in aqueous medium and preferably with heating, e.g. at a temperature in the range of 50 to 100° C., preferably 60 to 90° C. During the reaction, at least at the beginning, the basicity of the amine is sufficient for the quaternizing alkylation of the amine with the adduct, i.e. with the chloride used as an alkylating agent. The pH of the reaction mixture is preferably in the range of 4 to 9, at the beginning being preferably in the range of 7 to 9. As reaction proceeds, the alkalinity of the mixture and the concentration of crosslinking amine diminish. If in the reaction product there is present a proportion of covalently linked chlorine which is higher than desired, there may e.g. be added a further reactant which is a monofunctional tertiary amine and/or, if the starting crosslinking reactant is a secondary monoamine, there may be added a suitable strong base, such as an alkali metal hydroxide, preferably sodium hydroxide, so that the pH is preferably maintained in the range of 7 to 9. When the reaction has completed or has reached the desired degree, the reaction mixture is suitably acidified by addition of a conventional acid, preferably a mineral acid (such as hydrochloric acid, sulphuric acid or phosphoric acid) or a low molecular aliphatic carboxylic acid e.g. with 1 to 6 carbon atoms (such as formic acid, acetic acid, citric acid or lactic acid), preferably to reach a pH below 7, more preferably in the range of 4 to 7, most preferably in the range of 5 to 6.5. The progress of the reaction may be followed by checking the viscosity of the reaction mixture, which gives an empirical impression of the degree of crosslinking, i.e. quaternization. A suitable viscosity is e.g. in the range of 200 to 3000 cP.

In the production of ($P_A$)—in the absence of (B)—the concentration of the reactants is preferably chosen in such a way that the concentration of ($P_A$) in the resulting aqueous product is in the range of 10 to 75%, preferably 20 to 70% by weight.

Preferred polymers ($P_A$) are:
($P_{A1}$) polymers obtained by reaction of epichlorohydrin with oligohydroxyalkanes, in particular of formula (IIIa) or preferably (IIIa'), and further quaternizing reaction with amines, and ($P_{A2}$) polymers obtained by reaction of epichlorohydrin with a polyalkyleneglycol, in particular of formula (IIIb), preferably a polyethyleneglycol, and further reaction with quaternizing amines.

Among the above are preferred ($P_{A1}$).

For the production of ($P_{AB}$), the produced polymer ($P_A$), if desired in admixture with another cationic polymer, especially with a cationic starch, e.g. in the weight ratio of the latter to ($P_A$) of up to 20%, expediently in the form of an aqueous solution, may be combined with an aqueous solution of (B). Preferably however—for the production of ($P_{AB}$)—($P_A$) is not combined with any other cationic polymers. According to one feature of this process, the aqueous solution of (B) is added to the aqueous solution of ($P_A$), preferably stepwise and with heating, e.g. at temperatures in the range of 40° C. to the boil, preferably 40 to 90° C. According to a preferred feature of the process for the production of ($P_{AB}$), the solution of (B) is added to ($P_{PA}$) before polymerisation and/or crosslinking of ($P_A$) has completed. For the production of a composition ($P_{AB}$) from ($P_{A1}$) or ($P_{A2}$) it is preferred to add at least a part of the optical brightener (B) before the crosslinking reaction has completed and to add any remaining portion of the solution of (B) during the crosslinking reaction, so that there is obtained an aqueous composition in which at least a part of the optical brightener anions are the counter-ions to at least a part of the cations of ($P_{A1}$) or ($P_{A2}$) and (B) is also entrained by (or entangled with) ($P_{A1}$) or ($P_{A2}$). The pH is chosen suitably in such a way that salt-formation of ($P_A$) with (B) is favoured, expediently in the weakly acidic to distinctly alkaline range, preferably at a pH in the range of 5 to 10, more preferably 5.5 to 9. The ratio of (B) to ($P_A$) or to its precursor ($P_{PA}$) is chosen in such a way that the obtained product ($P_{AB}$) is of anionic character, which means that the overall anionic charge or pK due to the anionic groups present in (B) (i.e. sulpho and carboxy groups) prevails over the overall cationic charge or pK due to the quaternary ammonium groups of ($P_A$). Preferably the number of cations, in particular of quaternary cations, in ($P_A$) or respectively in ($P_{AB}$) is equal or inferior to the number of anions introduced with (B). The ratio of total anionic groups introduced with (B) to the total quaternary ammonium groups in ($P_A$) or respectively ($P_{AB}$) is e.g. in the range of 80/100 to 1000/100, preferably 100/100 to 600/100, more preferably >100/100, in particular in the range of 102/100 to 250/100, preferably 105/100 to 180/100. The weight ratio of (B) to ($P_A$) is chosen accordingly in a suitable way; the weight ratio of (B) to a suitable precursor of ($P_A$) is chosen accordingly. The anionicity of ($P_{AB}$), i.e. the overall anionic strength of the total sulpho and carboxy groups present, prevails over the total cationic strength of the quaternary ammonium groups present. The number of anionic groups of (B) not engaged with ($P_A$), expressed in milliequivalents per gram of ($P_{AB}$), is preferably equal to or superior, preferably by at least 0.1 meq/g, to the one of the cationic groups of ($P_A$) not engaged with (B). The difference is e.g. in the range of 0 to 1.2 meq/g, preferably 0 to 1 meq/g, more preferably 0 to 0.85 meq/g. The anionicity may be assessed e.g. by means of a "Charge Analyser" fitted with a photoelectric cell, by titration of a 0.1 weight-% ($P_{AB}$)-solution with a polyvinyl potassium sulphate solution (e.g. 0.00052N), using Toluidine Blue as an indicator (from blue=cationic to pink=anionic), at pH 4, 7 and 9 (adjusted by means of hydrochloric acid or potassium hydroxide solution).

The rate of addition and the concentration of the components is expediently chosen in such a way that a distinct increment of the viscosity of the obtained solution takes place and the solution of combined product ($P_{AB}$) is still easily stirrable, e.g. of a viscosity below 5000 cP, preferably in the range of 200 to 4000 cP, more preferably 400 to 2000 cP. A suitable concentration for the solution of (B) is in the range of 5 to 70, preferably 10 to 50% by weight. A suitable concentration for the solution of ($P_A$) is in the range of 10 to 80, preferably 20 to 70% by weight. A suitable concentration for the produced solution or dispersion of ($P_{AB}$) is in the range of 10 to 90, preferably 20 to 80% by weight. A particularly preferred viscosity for these concentrations is in the range of 500 to 2000 cP. The obtained aqueous composition (W) of ($P_{AB}$) is an aqueous solution, i.e. a true or at least colloidal solution, or a dispersion. The ($P_{AB}$)-content in (W) may vary broadly, depending in particular on the intended use and transport form. In concentrated compositions (W) the ($P_{AB}$)-content is e.g. in the range of 5 to 70%, preferably 8 to 50%, more preferably 10 to 40% by weight. It may be used directly as produced, or—if desired—it may be modified in salt content and/or concentration (a solution e.g. by membrane filtration) and/or it may be combined with any further desired components, especially at least one formulation additive (F). Suitable formulation additives are in general those conventional per se, in particular ($F_1$) an antimicrobic additive,
($F_2$) an acid, base or/and buffer salt for pH-adjustment,
($F_3$) a hydrotrope and/or ($F_4$) a defoamer.

Additives ($F_1$) are in particular additives for combating the damaging effect of microorganisms, e.g. an agent that stops the growth of disturbing micro-organisms or a microbicide (preferably a fungicide), e.g. in a concentration of 0.001 to 0.1% by weight referred to the liquid composition.

As ($F_2$) are suitable any acids, bases or buffers conventional in brightener or paper industry (e.g. alkali metal hydroxides, mineral acids or organic aliphatic acids and phosphate buffers, e.g. lithium, sodium or potassium hydroxide, sulphuric, phosphoric, acetic, citric or oxalic acid, and/or mono- or disodium phosphate) as are suitable for adjusting the pH to the desired value, which for (W), especially concentrated (W), is e.g. in the range of 4 to 7, preferably 4.5 to 6.5, more preferably 5 to 6.

A hydrotrope ($F_3$) may be employed if desired, e.g. urea or an oligoethylene glycol, e.g. in a concentration of 1 to 20% by weight of ($P_{AB}$). Preferably no ($F_3$) is employed in (W).

Suitable defoamers as ($F_4$) are also conventional ones, e.g. paraffine or silicone-based defoamers. They may be employed in very low concentrations, e.g. in the range of 0.001 to 0.1% by weight referred to the liquid composition.

The viscosity of (W) is advantageously below 5000 cP, for the concentrated compositions (W) it is preferably in the range of 200 to 4000 cP, more preferably 400 to 2000 cP.

The so produced compositions (W) combine the properties of component (B) as an optical brightener and of component ($P_A$) as an internal or external functional additive in papermaking, for instance as a flocculant, drainage assistant, retention adjuvant or/and fixative, and are compatible with components of sizing or coating compositions, in particular with binders, white pigments and fillers. The optical brightener ($P_{AB}$) compositions (W) of the invention provide in particular the possibility of adding the anionic optical brightener at any time before, during or after formation of the paper web or sheet. This means e.g. that the multi-functional composition of the invention may be added also in the aqueous stock, without it being necessary to immediately make the paper sheet, or it may be employed together with or in sizing compositions—also sizing compositions containing an inorganic filler—, as per se conventionally employed for producing paper sized in the stock or, after sheet or web formation, by application of a sizing composition in the size press, or it may be combined in a coating composition, in particular containing an inorganic white pigment. The term "paper" as used herein comprises any product obtainable in papermaking industry including not only paper as such but also heavier paper qualities, in particular board (paper board, card board, box board), and cast paper shapes.

Due to the possibility of varying the ratio of (B) to ($P_A$) in a very broad range, the optical brightener ($P_{AB}$) compositions or respectively (W) of the invention offer the possibility of increasing the proportion of (B) to ($P_A$) to very high ratios, as may be desired for achieving correspondingly high degrees of whiteness and also high whiteness maxima.

According to a particular feature of the invention it is also possible to mix products ($P_{AB}$) of different anionicities, in order to match a certain desired anionicity target, by mixing e.g. a higher anionic optical brightener ($P_{AB1}$) with a lower anionic optical brightener ($P_{AB2}$) in the required ratio. For this purpose ($P_{AB1}$) may e.g. be an optical brightener ($P_{AB}$) in which the ratio of total anionic groups of its (B) to the total quaternary ammonium groups of its ($P_A$) is >150/100, in particular in the range of 180/100 to 600/100, preferably 200/100 to 400/100, and ($P_{AB2}$) may e.g. be an optical brightener ($P_{AB}$) in which the ratio of total anionic groups of its (B) to the total quaternary ammonium groups of its ($P_A$) is ≦150/100, in particular in the range of 80/100 to 150/100, preferably 100/100 to 120/100, e.g. 100/100 to 105/100, the polymer ($P_A$) in ($P_{AB1}$) and in ($P_{AB2}$) being the same and the optical brightener (B) in ($P_{AB1}$) and in ($P_{AB2}$) being the same. Where it is desired to use a somewhat higher or lower anionicity than corresponding to a certain ($P_{AB}$) in the preferred anionicity, e.g. to an optical brightener ($P_{AB3}$) which is an optical brightener ($P_{AB}$) in which the ratio of total anionic groups of its (B) to the total quaternary ammonium groups of its ($P_A$) is in the range of 105/100 to 180/100, this may be mixed with a corresponding adjusting amount of ($P_{AB1}$) or ($P_{AB2}$) respectively, the polymer ($P_A$) in ($P_{AB3}$) and in admixed ($P_{AB1}$) or ($P_{AB2}$) being the same and the optical brightener (B) in ($P_{AB3}$) and in admixed ($P_{AB1}$) or ($P_{AB2}$) being the same. For this purpose the pairs of products ($P_{AB1}$) and ($P_{AB2}$) or of products ($P_{AB3}$) and either ($P_{AB1}$) or ($P_{AB2}$) are preferably employed in the form of aqueous compisitions (W), i.e. ($W_1$) and ($W_2$) or ($W_3$) and ($W_1$) or ($W_2$) of the same concentration referred to (B).

According to one aspect of the invention the optical brightener ($P_{AB}$) compositions (W) are suitable for the production of optically brightened paper by adding them in the stock before formation of the paper web or sheet or shape.

The ($P_{AB}$)-compositions of the invention, expediently in the form of aqueous composition as produced by the method described above, are readily dilutable with water in any proportion. They serve simultaneously as assistants in the production of paper, in particular as fixatives, for reducing the amount of backwater components, e.g. turbidity, in backwaters (white waters) from paper production, and as optical brighteners for producing optically brightened paper. The ($P_{AB}$) composition of the invention are, however, also compatible with other cationic additives or components that might be present or added in the stock, e.g. retention aids and/or cationic surfactants, and also other anionic additives.

A particular feature of the invention is thus represented also by the process for the production of optically brightened paper wherein an aqueous ($P_{AB}$)-solution or dispersion (W) as defined above is employed as a functional internal or external additive, optionally in the presence of other cationic additives.

The invention thus provides also a method for producing paper, in particular a paper web or sheet, from aqueous stock, wherein ($P_{AB}$) or respectively (W) is employed as a multifunctional adjuvant, especially as an optical brightening agent and as a fixative. As an aqueous stock there is intended any stock, in particular cellulosic stock, as employed for papermaking and wherein the pulp suspension may derive from any origin as conventionally employed for papermaking, e.g. virgin fiber (chemical or mechanical pulp), machine broke (in particular coated broke) and reclaimed paper (especially deinked and optionally bleached reclaimed paper). The aqueous paper pulp or stock may also contain further additions as may be desired for a certain quality, such as sizing agents, fillers, flocculating agents, drainage and/or retention assistants, which are preferably added in any desired sequence before, simultaneously with or after the addition of ($P_{AB}$). The stock concentration may vary in any conventional range as suitable for the employed pulp, machine, process and desired paper quality, e.g. in the range of 0.4 to 10%, preferably 0.8 to 6%, by weight of dry pulp. According to a particular feature of the invention there is employed a pulp from coated broke and/or bleached, deinked reclaimed paper optionally blended with other pulp.

The optical brighteners ($P_{AB}$) are preferably employed in a concentration in the range of 0.05 to 0.5% by weight, more preferably 0.1 to 0.4% by weight referred to dry pulp. The pH may be in the weakly basic to distinctly acidic range, preferably in the range of pH 4 to pH 8, more preferably pH 5 to pH 7. The paper may be produced using any conventional papermaking machines and in a manner conventional per se. The resulting backwater is of reduced contaminants content, in particular of reduced turbidity, and consequently the respective BOD and/or COD values are also reduced.

According to a further aspect of the invention the compositions ($P_{AB}$) are suitable for the production of optically brightened sized or/and coated paper by adding them in sizing or/and coating compositions which are applied to the paper substrate after formation of the paper web or sheet or other shape.

The sizing compositions may contain conventional components, in particular binders and optionally co-binders, fillers, pigments, dispersants and/or further adjuvants conventional per se.

Any binders and co-binders, conventional in sizing compositions may be employed, e.g. optionally modified natural products, e.g. starches (e.g. starches or starch derivatives, in particular neutral starches, cationic starches or anionic starches), casein, soy bean protein or modified cellulose (carboxymethylcellulose, methylcellulose, hydroxyethylcellulose), or synthetic latices, e.g. styrene/butadiene polymers, acrylic polymers, vinylacetate polymers, polyvinylalcohol, polyvinylpyrrolidone and optionally polyurethanes. They may be employed in concentrations conventional pr se in sizing compositions, preferably in the range of 1 to 20%, more preferably 2 to 12% by weight of the aqueous sizing composition.

If desired the sizing compositions may contain inorganic fillers or pigments. As fillers or pigments there may be employed conventional ones. Preferably, however, they do not contain any fillers and, more preferably, also no pigments.

The optical brighteners ($P_{AB}$) are preferably employed in a concentration in the range of 0.02 to 0.5% by weight, more preferably 0.05 to 0.2% by weight referred to dry paper. The pH may be in the weakly basic to distinctly acidic range, preferably in the range of pH 4 to pH 8, more preferably pH 5 to pH 7. The paper web or sheet or other shape may be produced using any conventional papermaking machines.

The coating compositions may contain conventional components, in particular inorganic pigments, binders (e.g. selected from those mentioned above), dispersants (e.g. polyacrylates or polyphosphates) and optionally further adjuvants conventional per se.

The inorganic pigments comprise in general known inorganic substances as usually employed as white pigments or fillers (or loading agents), and which more particularly are conventionally employed in non-coloured form in papermaking.

The inorganic pigments or fillers may be any such substances, naturally occurring and optionally physically modified, or synthetically produced, and preferably as employed in particular in paper coatings or as fillers or loading agents in the paper sheet, as added e.g. in the size or also in the paper pulp suspension. They may include mineral substances and synthetically produced inorganic substances, such as silica, alumina, titanium dioxide, zinc oxide and sulphide, and inorganic salts, e.g. silicates, aluminates, titanates, sulphates and carbonates, of low valence metal ions, mainly of alkali metal ions, alkaline earth metal ions or earth metal ions, especially of sodium, potassium, magnesium, calcium, barium and/or aluminium. The following may be mentioned as examples: titanium dioxides (rutile, anatase), potassium titanates, zinc oxide, zinc sulphide, lithopone, calcium sulphates (gypsum or anhydrite), various forms of silica (e.g. amorphous silica such as diatomite), alumina trihydrate, sodium silico-aluminate, talc ($MgO.4SiO_2.H_2O$), barium sulphate (baryte, blanc fixe), calcium sulphoaluminate (satin white), chrysotile, china clay in various degrees of whiteness (mainly comprising $Al_2O_3.SiO_2.H_2O$ and optionally further metal oxides such as iron oxide, titanium dioxide, magnesium oxide, calcium oxide, sodium oxide and/or potassium oxide) and calcium carbonate in various forms (mineral natural form or synthetic precipitated and/or crystallised forms). They may be employed in the forms as commercially available, in particular of various degrees of whiteness, e.g. of a whiteness >80, mostly >82 (measured according to ISO methods), but also less white products may be used, e.g. of a whiteness $\leq 82$, or even $\leq 80$, e.g. in the range of 70 to 80 (e.g. CIE-whiteness, as may be measured spectrophotometrically).

The particle size of the pigment or filler may range in usual scopes, e.g. in the range of 0.1 to 40 μm, as obtainable by conventional methods, e.g. by grinding and/or milling and/or—if required—sieving and screening, or by suitable precipitation and/or (micro)crystallisation methods. Commercially available products mostly contain in general a certain proportion of particles smaller than 0.1 μm (dust) and/or some granules larger than 40 μm; preferably these larger size components are $\leq 20\%$ by weight, more preferably ≦10% by weight. Preferably the average particle size of such inorganic pigments is within the range of 0.1 to 20 µm, more preferably 0.2 to 10 µm, most preferably 0.2 to 5 µm, preferably at least 75%, more preferably ≧80% of the particles being within these ranges. Preferred inorganic pigments and fillers have e.g. a specific surface area in the range of 5 to 24 m$^2$/g, preferably 7 to 18 m$^2$/g. Among the mentioned pigments and fillers are preferred those comprising carbonates, in particular calcium carbonates.

The inorganic pigments and fillers may be employed in commercially available forms, which may also comprise a conventional dispersant or wetting agent, on its surface, e.g. polyphosphates, in a suitable low concentration as usual e.g. <0.5% by weight, preferably <0.3% by weight. For the purpose of the invention the presence of such a surfactant is not essential and the pigment may also be exempt of a dispersant or wetting agent. As mentioned above, the pigment may be employed in the forms as commercially available, in particular it may be employed in dry form or in the form of a concentrated aqueous slurry, e.g. with a solids content in the range of 40 to 70% by weight.

For the production of a coating composition the optical brightener ($P_{AB}$) composition (W) may be mixed with conventional coating composition components exempt of optical brighteners, in particular pigments, dispersants, adhesives and water and optionally further adjuvants such as anti-foam agents or defoamers, flow modifiers, lubricants and optionally surface finishing agents or adjuvants.

If desired, a white pigment or filler pretreated with ($P_{AB}$) may be produced in the form of an aqueous slurry or even in dry form. For this purpose the inorganic white pigment or filler may e.g. be mixed with ($P_{AB}$) or respectively (W) in aqueous medium or a solution or dispersion (W) of ($P_{AB}$) may be sprayed on a dry inorganic white pigment or filler powder with mixing. The produced aqueous suspension may, if desired, be filtered and dried to a ($P_{AB}$)-containing white pigment or filler in dry, particulate form of corresponding particle size. If desired it may be agglomerated to larger agglomerate particles, e.g. by compaction e.g. to granules, pellets or tablets. This process is preferably carried out substantially in the absence of further functional additives that would interfere in a disturbing way with the reaction, in particular in the absence of other functional papermaking additives and components (such as resins, fibres and/or paper-size components). The weight ratio of ($P_{AB}$) to inorganic pigment or filler—referred to the respective dry forms—may range broadly, depending on the desired use and effect; it may e.g. range in the scope of 0.01:100 to 10:100, preferably 0.2:100 to 5:100, more preferably 0.3:100 to 4:100. For compacted dry forms this weight ratio is preferably in the range of 0.01:100 to 3:100, more preferably 0.2:100 to 2:100.

The optical brightener composition ($P_{AB}$) may be applied in the form of an aqueous solution or dispersion (W) e.g. of a concentration in the range 0.1 to 700 g/l, to the inorganic pigment by any suitable method. If the inorganic pigment is used in the form of an aqueous slurry, the ($P_{AB}$)-composition (W) is preferably a concentrated solution or dispersion—e.g. of a concentration in the range 20 g/l to 700 g/l, preferably in the range of 50 g/l to 600 g/l—and may be mixed with it in the desired proportion e.g. by plain stirring and optionally with heating or cooling, e.g. at a temperature in the range of 5 to 60° C., preferably 10 to 40° C., more preferably with slight heating e.g. in the temperature range of 25 to 40° C. or at ambient conditions without any heating or cooling. If the inorganic pigment is in the dry form, a sprayable, preferably more diluted aqueous solution or dispersion of ($P_{AB}$)—e.g. of a concentration in the range of 0.1 to 40 g/l, preferably 0.5 to 20 g/l—may e.g. be applied by spraying and mixing, optionally with heating or cooling, e.g. at a temperature in the range of 5 to 60° C., preferably 10 to 40° C., more preferably with slight heating e.g. in the temperature range of 25 to 40° C., or at ambient conditions without any heating or cooling. The pH of the aqueous composition (W) of ($P_{AB}$) may range broadly, e.g. from the weakly acidic to weakly basic range, in particular from pH 5 to pH 8, preferably pH 5.5 to pH 7.5.

The so modified white pigments or fillers, which are the products of the application of ($P_{AB}$) or respectively (W) to the inorganic white pigment or filler, combine the physical properties of the inorganic white pigment or filler with the chemical properties of ($P_{AB}$); i.e. they may be used as pigments or fillers in various stages of paper production and, due to the possibility of increasing the proportion of (B) to ($P_A$) in ($P_{AB}$) to a high degree, they provide the possibility of achieving very high degrees of whiteness and also very high whiteness maxima, further they favour drainage, retention and fixation, and the compacted forms are readily dispersible in water to give a regular suspension that may be used for producing brightener and filler or white-pigment-containing coating masses, size liquors or paper pulp suspensions. These brightener-treated white pigments are also readily compatible with other cationic products that might be used in paper production, such as drainage aids, retention assistants and fixatives, e.g. with cationic starches.

The invention thus provides also a method for producing paper, in particular a paper web or sheet, from aqueous stock, wherein a ($P_{AB}$)-treated white pigment or filler is employed as a white pigment or filler.

By the use of ($P_{AB}$) or respectively (W) there may also be achieved an improvement of the efficiency of other wet-end additives, especially cationic ones, such as flocculants, retention assistants or drainage assistants, and there may be obtained paper of optimum quality while the occurrence of paper breakings due to disturbing anionic contaminants is correspondingly reduced, and the efficiency of the optical brightener (B) is optimal and there is obtainable paper of very regular whiteness in high yield. The so produced paper is suitable as graphic paper and may in particular be employed as a substrate for ink-jet-printing.

In the following Examples parts and percentages are by weight, if not otherwise indicated; parts by weight relate to parts by volume as grams to milliliters; the temperatures are indicated in degrees Celsius; in Application Examples D and E ° SR signifies degrees Schopper-Riegler and the p % and size percentages relate to the weight of the starting aqueous pulp suspension.

EXAMPLE 1

In a closed vessel which is fitted with an overhead stirrer, a condenser, a dropping funnel and a calibrated thermometer, 70.2 parts of sorbitol are mixed with 35.5 parts of glycerol and heated to 90° C. to form a solution. The solution is cooled to 80° C. and 0.5 part of boron trifluoride acetic acid complex ($M_W$ 187.91) is added and stirring is continued until the catalyst is fully dispersed throughout the reaction mixture. 10 parts of epichlorohydrin are added at 80° C., so that an exotherm results. Further 202.1 parts of epichlorohydrin are then added over 1 hour at 80–85° C., with cooling. The reaction mixture is then cooled to 30° C., the air in the vessel is evacuated, 86.8 parts of an aqueous 60% dimethylamine solution are drawn in and the reaction mixture is heated slowly to 90° C. and held for one hour at 80–90° C. The vacuum is then released and the reaction mixture is cooled to 60° C. At this temperature 971.0 parts of an aqueous 18% solution of the sodium salt of the optical brightener of formula

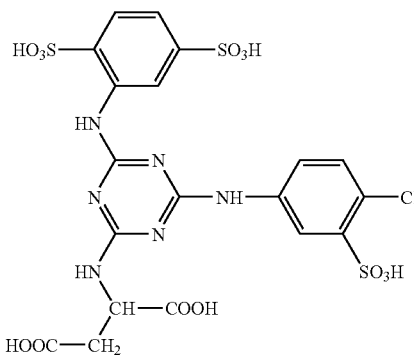

(1)

(produced using L-aspartic acid) and 90.4 parts of sodium hydroxide, in the form of a 30% aqueous solution, are added at 65–70° C. The mixture is held at 65–70° C. and it slowly thickens as it polymerises. When the reaction mixture reaches the viscosity of 1000 cP the reaction is stopped by the addition of 20 parts of formic acid to give a pH of 5.5.

EXAMPLE 2

The procedure described in Example 1 is repeated, with the difference that instead of 971.0 parts of the optical brightener solution there are employed 1294.8 parts thereof.

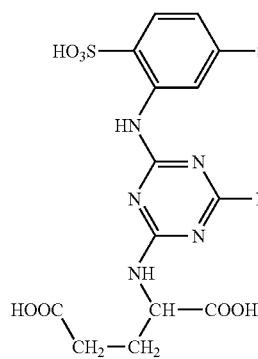

EXAMPLE 3

The procedure described in Example 1 is repeated, with the difference that instead of 971.0 parts of the optical brightener solution there are employed 1553.6 parts thereof.

EXAMPLE 4

The procedure described in Example 1 is repeated, with the difference that instead of 971.0 parts of the optical brightener solution there are employed 1942.0 parts thereof.

EXAMPLES 5–8

The procedures described in each of Examples 1–4 is repeated, with the difference that instead of the optical brightener of formula (1) produced with L-aspartic acid there is employed the optical brightener of formula (1) produced with racemic aspartic acid.

EXAMPLE 9

The procedure described in Example 1 is repeated, with the difference that instead of the 971.0 parts of the 18% solution of the sodium salt of the optical brightener of formula (1) there are employed 989.0 parts of an 18% solution of the sodium salt of the optical brightener of formula

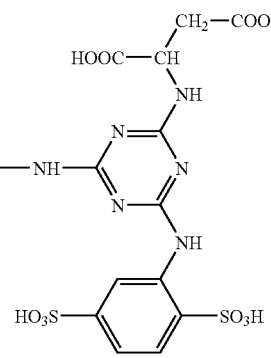

(2)

(produced using L-glutamic acid).

EXAMPLES 10–12

The procedure described in Examples 2–4 is repeated, with the difference that instead of the indicated quantity of the 18% solution of the optical brightener of formula (1) there is employed the equivalent amount of the 18% solution of the optical brightener of formula (2).

APPLICATION EXAMPLE A

Sizing solutions are prepared by adding a predetermined amount of the product of Example 1 (0, 1.25, 2.5, 5, 7.5 and 10 mmol/kg referred to the optical brightener) to a stirred aqueous solution of a typical size-press starch (typically a cationic starch, such as CATO-SIZE 470 from National Starch, or an anionic starch, such as Perfectamyl from Tunnel Avebe) at 60° C. The solution is diluted with water to a starch content concentration of 10%. The sizing solution is poured between the moving rollers of a laboratory size-press and applied to a commercial 75 g/m² neutral-sized (with conventional alkyl ketene dimer), bleached paper base sheet, to an uptake of 30% by weight referred to the dry weight of the substrate. The treated paper is dried for 5 minutes at 70° C. in a flat bed drier. The dried paper is allowed to condition, then measured for CIE whiteness on a calibrated Datacolor ELREPHO 2000 spectrophotometer. The measured values show a surprisingly high whiteness degree and yield for the sheets treated with the product of Example 1.

APPLICATION EXAMPLE B

A coating composition is prepared containing 3000 parts chalk (fine, white, high purity calcium carbonate with a density by ISO 787/10 of 2.7, commercially available under the trade name HYDROCARB OG of Plüss-Stauffer AG, Oftringen, Switzerland), 1932 parts water, 18 parts anionic dispersing agent (sodium polyacrylate), and 600 parts latex (a copolymer of n-butyl acrylate and styrene latex of pH 7.5–8.5, commercially available under the trade name ACRONAL S320D). A predetermined amount of the product of Example 1 (0, 0.313, 0.625, 0.938, 1.25 and 1.875 mmol/kg referred to the optical brightener) is added with stirring to the coating composition, and the solids content is adjusted to 55% by the addition of water. The so prepared coating composition is then applied to a commercial 75 g/m² neutral-sized (with conventional alkyl ketene dimer), bleached paper base sheet, using an automatic wire-wound bar applicator with a standard speed setting and a standard load on the bar. The coated paper is dried for 5 minutes at 70° C. in a hot air flow. The dried paper is allowed to condition, then measured for CIE whiteness on a calibrated Datacolor ELREPHO 2000 spectrophotometer. The measured values show a surprisingly high whiteness degree and yield for the sheets treated with the product of Example 1.

APPLICATION EXAMPLE C

The procedure described in Application Example B is repeated, with the difference that instead of 3000 parts of the chalk HYDROCARB OG there are employed 3000 parts of the chalk HYDROCARB 90 (from Omya UK), and that 150 parts of anionic starch (Perfectamyl A4692, from Tunnel Avebe) are further added.

APPLICATION EXAMPLE D 200 g of a pulp suspension (2.5% aqueous suspension of a 50% mixture of bleached soft wood and hard wood pulps beaten to a freeness of about 20° SR) is measured into a beaker and stirred. The suspension is stirred for one minute and p % of the product of Example 1 is added (p=0, 0.1, 0.2, 0.4, 0.8, 1, 1.4, 1.8 and 2; p=0 representing the blank). After the addition the mixture is stirred for a further 0.5 minutes and then 1.7% (3.4 g) of neutral size is added (typically a dispersion of 2.5 g of Aquapel 360×in water—Aquapel 360X is an alkylketene dimer size suspension from Hercules Ltd.). After the addition of the size a retention aid may be added—typically Cartaretin PC. The mixture is then diluted to one litre and the paper sheet is formed on a laboratory sheet former (basically this is a cylinder with a wire gauze at the bottom—the cylinder is partly filled with water, the pulp suspension is added, air is then blown through to ensure the pulp is well dispersed, a vacuum is then applied and the pulp slurry is pulled through the wire to leave a paper sheet, this sheet is removed from the wire and pressed and dried). The whiteness of the sheet is measured using a Datacolor ELREPHO 2000 spectrophotometer. The measured values show a surprisingly high whiteness degree and yield for the sheets treated with the product of Example 1.

APPLICATION EXAMPLE E 200 g of a pulp suspension (2.5% aqueous suspension of a 50% mixture of bleached soft wood and hard wood pulps beaten to a freeness of about 20° SR) is measured into a beaker and stirred. The suspension is stirred for one minute and p % of the product of Example 1 is added (p=0, 0.1, 0.2, 0.4, 0.8, 1, 1.4, 1.8 and 2; p=0 representing the blank). After the addition the mixture is stirred for a further 5 minutes and then 2% of rosin size solution is added (typically "T size 22/30" from Hercules), the mixture is stirred for a further 2 minutes and then 3 ml of alum solution (50 g alum in 1 litre water) are added and the mixture is stirred for a further 2 minutes. The mixture is then diluted to one litre and the paper sheet is formed on a laboratory sheet former. The whiteness of the sheet is measured using a Datacolor ELREPHO 2000 Spectrophotometer. The measured values show a surprisingly high whiteness degree and yield for the sheets treated with the product of Example 1.

Analogously as the product of Example 1, the products of each of Examples 2 to 12 are employed in the above Application Examples A, B, C, D and E.

What is claimed is:
1. An optical brightener ($P_{AB}$) of formula (I)

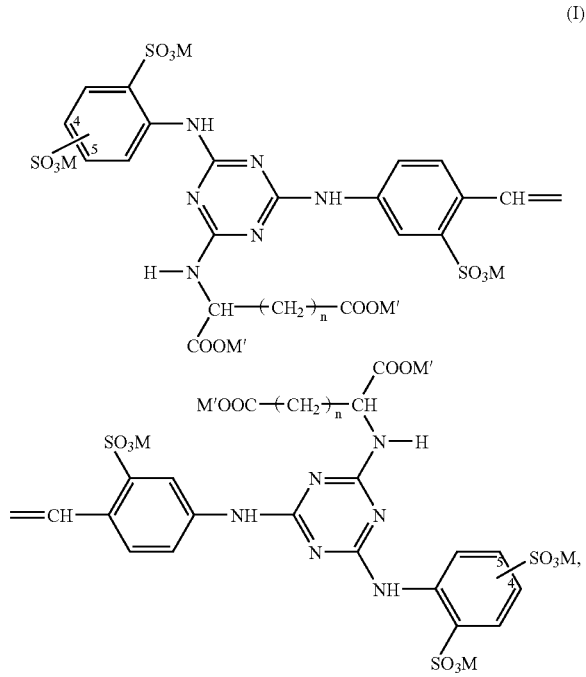

wherein
each n independently is 1 or 2,
the group $SO_3M$ shown with the floating bond is linked to the position 4 or 5,
each M independently is an equivalent of a non-chromophoric cation
and each M' independently is hydrogen or M, at least a part of the cations M of ($P_{AB}$) are cationic groups of a polycationic polyol/epichlorohydrin/amine polymer ($P_A$), containing quaternary ammonium groups in salt form as heteroatomic ring members or chain members, the remaining cations M of ($P_{AB}$) are selected from the group consisting of alkali metal cations, unsubstituted ammonium and ammonium substituted with $C_{1-3}$-alkyl or/and $C_{2-3}$-hydroxyalkyl, the polycationic polymer ($P_A$) is a polymer which is at least in part crosslinked over one or more of its quaternary ammonium groups, the remaining counterions to the cationic groups of ($P_A$) being non-chromophoric anions of low molecular acids, and the ratio of the total anionic groups in the anionic optical brightener portion of ($P_{AB}$) to the total of cationic ammonium groups in the polycationic polymer ($P_A$) portion of ($P_{AB}$) is $\geq 80/100$.

2. A liquid aqueous optical brightener composition (W) comprising an optical brightener ($P_{AB}$) according to claim 1.

3. A liquid aqueous composition (W) according to claim 2, further comprising at least one formulation additive (F) selected from the group consisting of ($F_1$) an antimicrobial additive, ($F_2$) an acid, base and/or buffer salt for pH-adjustment, and ($F_4$) a defoamer.

4. An optical brightener ($P_{AB}$) according to claim 1, wherein the ratio of the total anionic groups in the anionic optical brightener portion of ($P_{AB}$) to the total of cationic ammonium groups in the polycationic polymer ($P_A$) portion of ($P_{AB}$) is in the range of 100/100 to 600/100.

5. Process for the production of a liquid aqueous optical brightener composition (W) according to claim 2, comprising the step of adding an aqueous solution of (B) an anionic optical brightener of the formula (II)

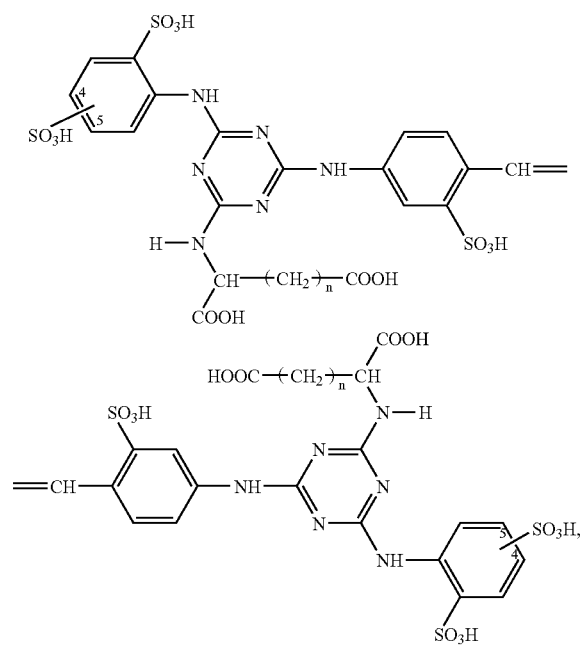

wherein
each n independently signifies 1 or 2,
and the group $SO_3H$ shown with the floating bond is linked to the position 4 or 5, in free acid or alkali metal or/and ammonium salt form, wherein ammonium is unsubstituted or substituted with $C_{1-3}$-alkyl or/and $C_{2-3}$-hydroxyalkyl, to an aqueous solution of ($P_A$) a polycationic polyol/epichlorohydrin/amine polymer containing quaternary ammonium groups in salt form as heteroatomic chain members or ring members of the polymer, which is at least in part crosslinked over one or more of these quaternary ammonium groups and in which the counter-ions to the cationic quaternary ammonium groups are anions selected from the group consisting of mineral acids, anions of low molecular carboxylic acids and anions deriving from a quaternizing agent, in such an equivalents ratio that the total anionic groups in the anionic optical brightener (B) to the total of cationic ammonium groups in the polycationic polymer ($P_A$) is $\geq 80/100$, and the obtained product ($P_{AB}$) is in the form of a liquid aqueous composition (W).

6. Process according to claim 5, further comprising the step of adding one or more formulation additives (F) selected from the group consisting of ($F_1$) an antimicrobic additive, ($F_2$) an acid, base and/or buffer salt for pH-adjustment, and ($F_4$) a defoamer after completion of the production of ($P_{AB}$).

7. A method for optically brightening a substrate comprising the step of applying to or incorporating in the substrate an optical brightener according to claim 1.

8. The method according to claim 7, wherein the substrate is paper or board.

9. A brightener-containing composition comprising a white pigment and an optical brightener ($P_{AB}$) according to claim 1, wherein the composition is in the form of an aqueous slurry or in dry form.

10. A method for optically brightening paper comprising the step of applying to the paper a brightener-containing composition, wherein the brightener-containing composition comprises white pigment or a filler, and an optical brightener ($P_{AB}$) according to claim 1, wherein the brightener-containing composition is in the form of an aqueous slurry or dry form.

11. Paper produced by the process according to claim 8.

12. A substrate for ink-jet printing comprising paper according to claim 11.

13. Process for the production of a liquid aqueous optical brightener composition (W) according to claim 2, comprising the step of adding an aqueous solution of (B), an anionic optical brightener of the formula (II)

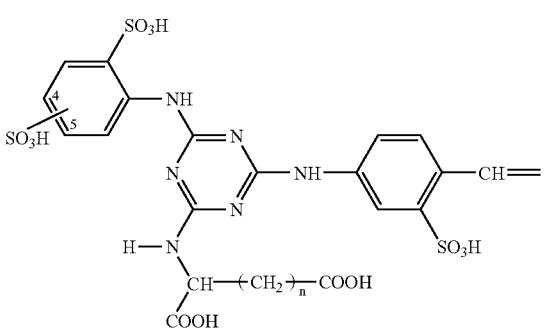

-continued

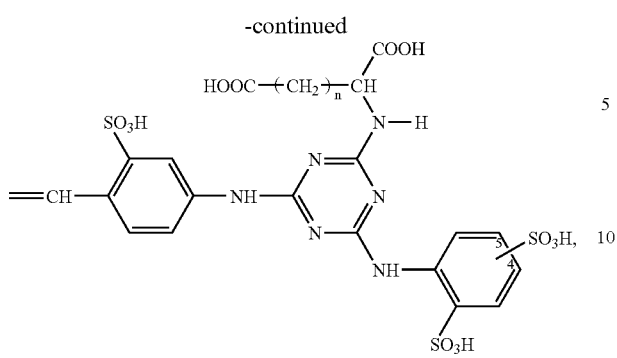

wherein
each n is signifies 1 or 2,
and the group SO₃H shown with the floating bond is linked to the position 4 or 5, in the form of the free acid or alkali metal salt, to a precursor ($P_{PA}$) of ($P_A$):

($P_A$) a polycationic polyol/epichlorohydrin/amine polymer containing quaternary ammonium groups in salt form as heteroatomic chain members or ring members of the polymer, which is at least in part crosslinked over one or more of these quaternary ammonium groups and in which the counter-ions to the cationic quaternary ammonium groups are anions selected from the group consisting of mineral acids, anions of low molecular carboxylic acids and anions deriving from a quaternizing agent, before completion of polymerisation and/or crosslinking, and the polymerisation and/or crosslinking reaction is completed in the presence of (B), to give a solution or dispersion of the product ($P_{AB}$) which is a polymer ($P_{AB}'$) containing (B) at least in part in entrained or entangled salt form, in such an equivalents ratio that the total anionic groups in the anionic optical brightener (B) to the total of cationic ammonium groups in the polycationic polymer ($P_A$) is $\geq 80/100$, and the product ($P_{AB}$) is in the form of a liquid aqueous composition (W).

14. A brightener-containing composition comprising a filler and an optical brightener ($P_{AB}$) according to claim 1, wherein the composition is in the form of an aqueous slurry or in dry form.

* * * * *